United States Patent [19]
Chen

[11] Patent Number: 5,662,427
[45] Date of Patent: Sep. 2, 1997

[54] UNIVERSAL WIPER ARM CONNECTOR

[76] Inventor: Liang-Yuan Chen, P.O. Box 82-144, Taipei, Taiwan

[21] Appl. No.: 629,073

[22] Filed: Apr. 8, 1996

[51] Int. Cl.[6] ..................................... F16B 7/18
[52] U.S. Cl. .................. 403/362; 403/363; 403/24; 15/250.32; 15/250.351
[58] Field of Search .................. 403/362, 363, 403/380, 292, 24, 375; 15/250.32, 250.33, 250.31, 250.351

[56] References Cited

U.S. PATENT DOCUMENTS

| 2,234,709 | 3/1941 | Rodrick | 15/250.32 |
| 2,850,304 | 9/1958 | Wagner | 403/362 X |
| 3,824,648 | 7/1974 | Van Den Berg et al. | 15/250.32 |
| 3,864,783 | 2/1975 | Arman | 15/250.32 X |
| 3,900,269 | 8/1975 | Pavlot | 403/292 |
| 5,188,329 | 2/1993 | Takahara | 297/344.1 X |

FOREIGN PATENT DOCUMENTS

| 2268180 | 11/1975 | France | 403/363 |
| 1203144 | 10/1965 | Germany | 15/250.32 |
| 4322631 | 1/1995 | Germany | 403/363 |

*Primary Examiner*—Harry C. Kim
*Attorney, Agent, or Firm*—Alfred Lei

[57] ABSTRACT

A universal wiper arm connector includes a generally inverted U-shaped outer seat having a central threaded hole at a top thereof and two downwardly depending arms each having an inwardly extending toothed portion. A generally inverted M-shaped inner seat is adapted to fit into the outer seat and has a recessed portion with a curved bottom and two downwardly depending arms formed at a lower edge with teeth adapted to engage with the toothed portion of the outer seat. A locking bolt having external threads is engageable with the threaded hole of the outer seat, whereby the connector can be engaged with wiper arms of different sizes.

1 Claim, 4 Drawing Sheets

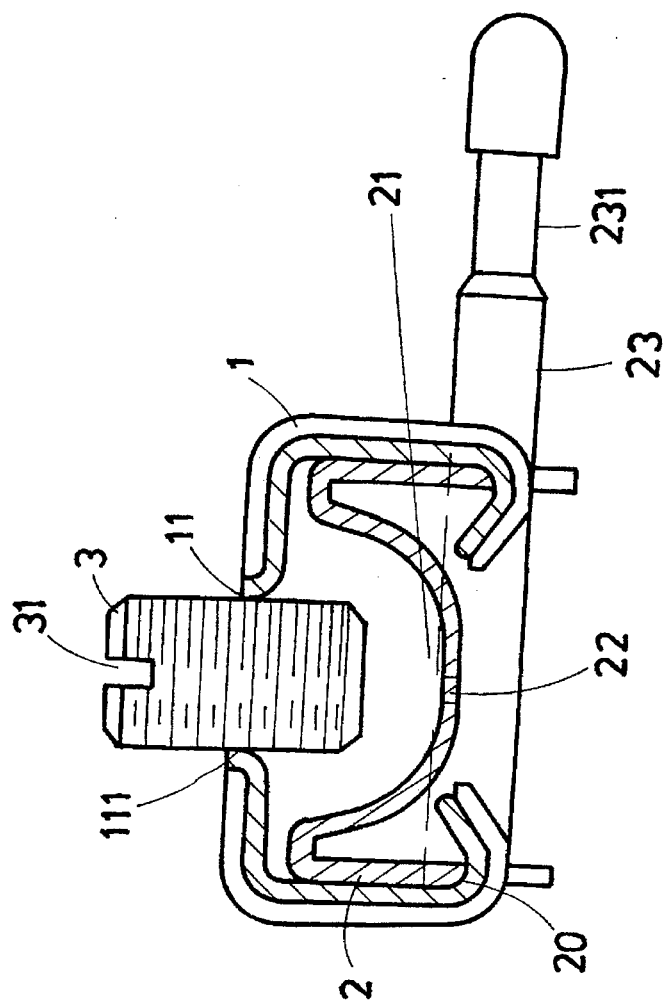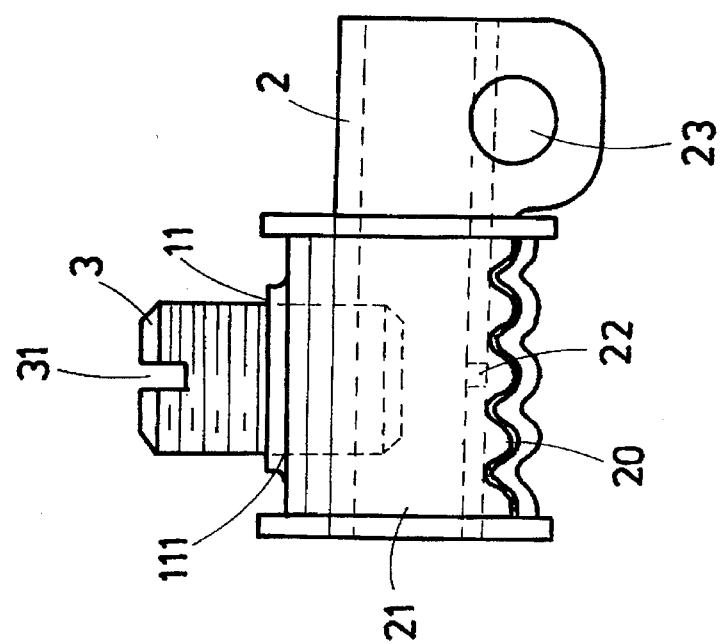

UNIVERSAL WIPER ARM CONNECTOR

BACKGROUND OF THE INVENTION

1. Field of the Invention

This invention relates to a universal wiper arm connector which can be connected with wiper arms of different sizes.

2. Description of the Prior Art

It has been found that the conventional wiper arms on the marketplace are of different sizes so that it is necessary to use a particular connector to connect a wiper arm with a windshield wiper. Hence, once a wiper arm connector is not working or does not work properly, the user must go to find a particular wiper arm connector for a certain kind of wiper arm thus causing much inconvenience. Furthermore, it is common for a user to spend a lot of time trying to find the particular connector. Quite often, the user simply replaces the entire wiper arm with a new one because the appropriate connector cannot be located, thereby wasting both time and money.

Therefore, it is an object of the present invention to provide an improved wiper arm connector which can obviate and mitigate the above-mentioned drawbacks.

SUMMARY OF THE INVENTION

This invention is concerned with a universal wiper arm connector.

It is the primary object of the present invention to provide a universal wiper arm connector which can be easily adjusted to engage with wiper arms of different sizes.

It is another object of the present invention to provide a universal wiper arm connector which is simple and sturdy in construction.

It is still another object of the present invention to provide a wiper arm connector which is facile and cheap to manufacture.

It is still another object of the present invention to provide a wiper arm connector which may be placed at the market at a very low cost.

It is a further object of the present invention to provide a wiper arm connector which convenient and reliable in use.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 3A is a side view of the present invention;

FIG. 3B is a sectional front view of the present invention;

DETAILED DESCRIPTION OF THE PREFERRED EMBODIMENT

Figure 1:
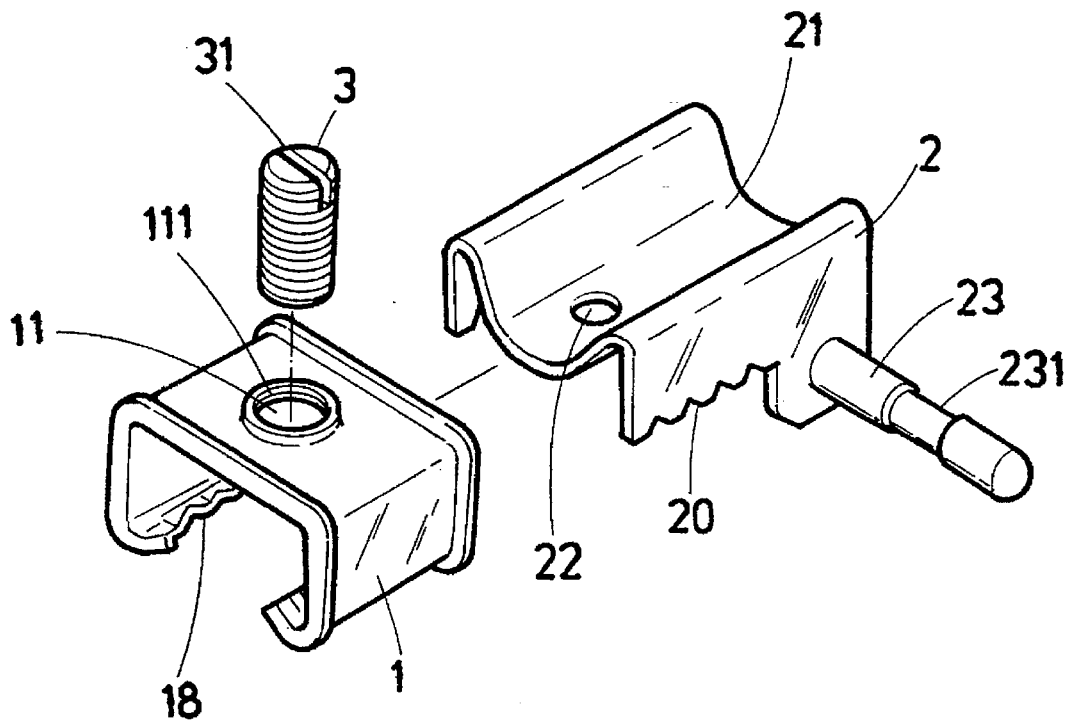
FIG. 1 is an exploded view of the present invention.
Figure 2:
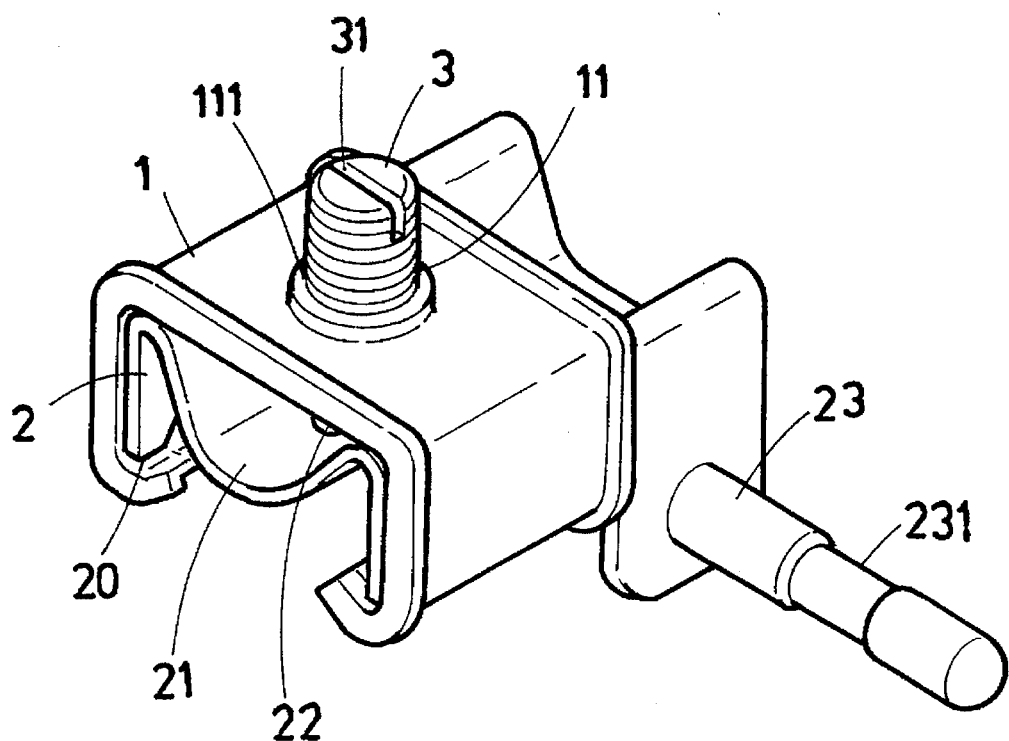
FIG. 2 is a perspective view of the present invention.
Figure 4:
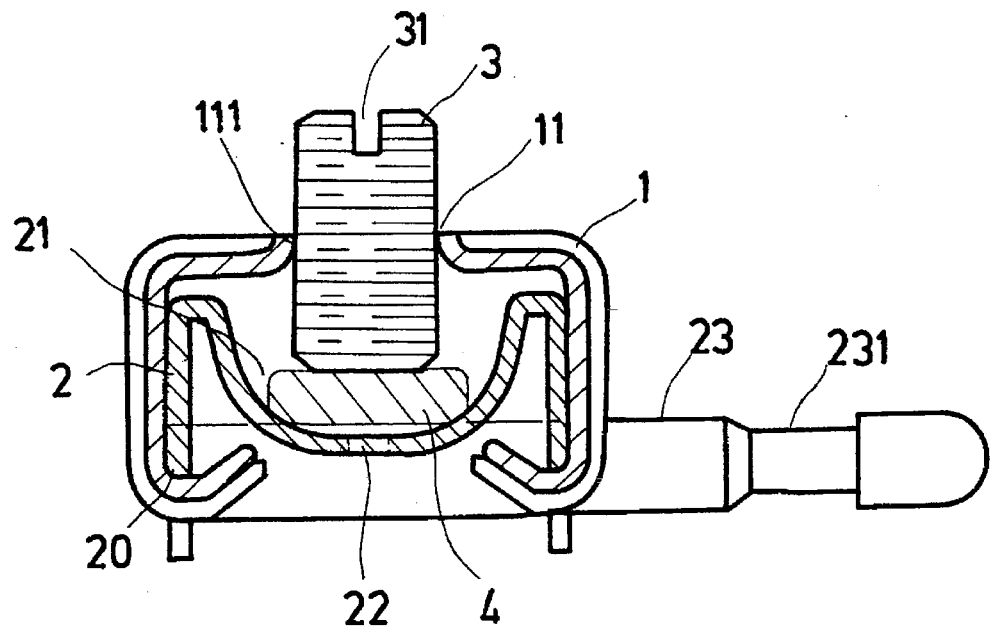
FIGS. 4 and 5 are sectional views illustrating the engagement between the present invention and wiper arms of different width.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIGS. 1, 2, 3A and 3B thereof, the universal wiper arm connector according to the present invention comprises an outer seat 1, an inner seat 2 and a locking bolt 3.

The outer seat 1 is a generally inverted U-shaped member formed at the top with a central hole 11 having threads 111. The inverted U-shaped member has two downwardly depending arms each having an inwardly extending toothed portion 18.

The locking bolt 3 is provided with external threads adapted to engage with the threads ill of the central hole. 11. The upper end of the locking bolt 3 has a slot 31 adapted to receive the tip of a screwdriver (not shown).

Figure 6:
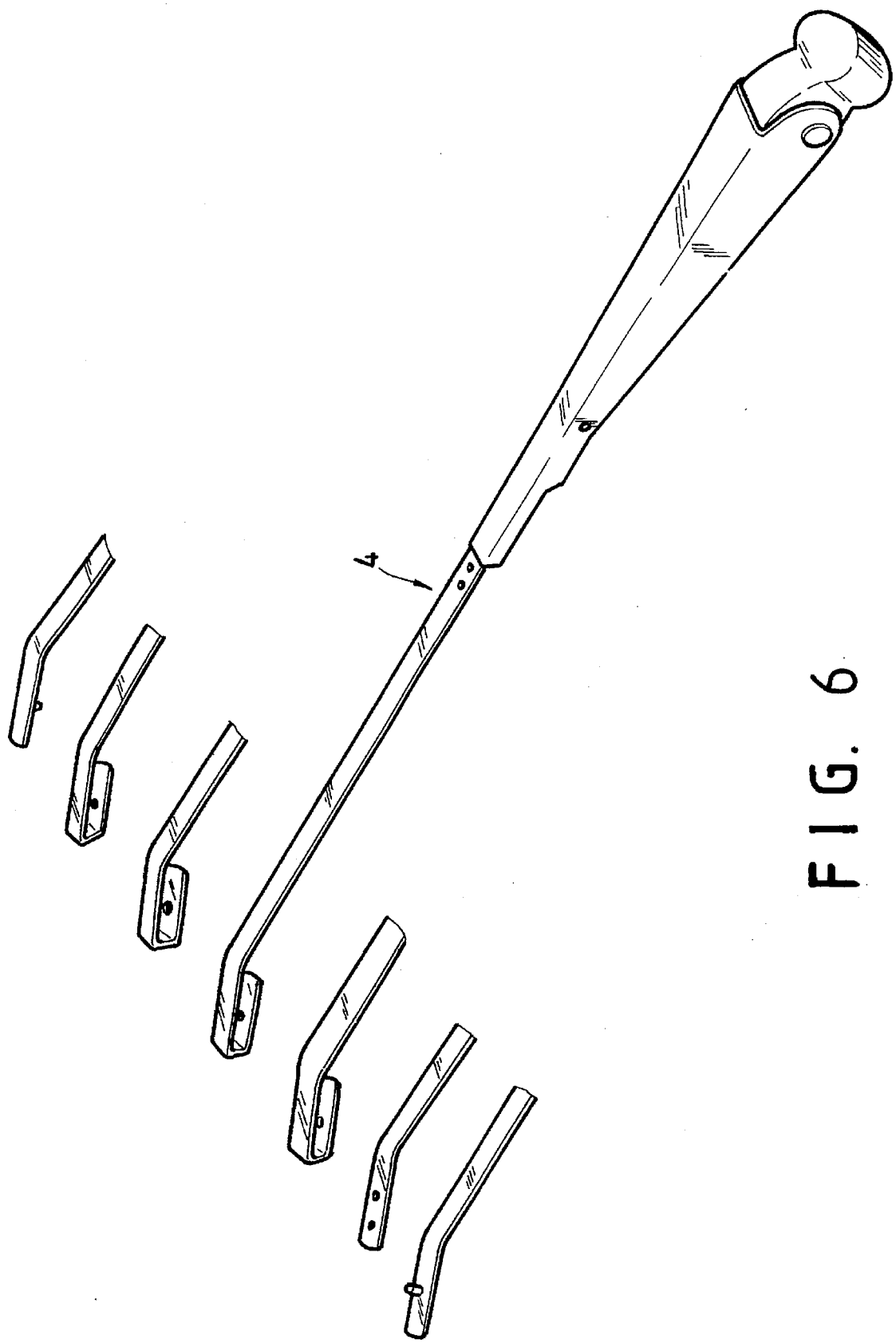
FIG. 6 shows wiper arms of different sizes and shapes.

The inner seat 2 is also a generally M-shaped member adapted to be fitted into the outer seat 1. The inner seat 2 has a recessed portion 21 at the top formed with a hole 22 and two downwardly depending arms formed at the lower edge with teeth 20 adapted to engage with the toothed portion 18 of the outer seat 1. The hole 22 is designed to receive a protuberance of a wiper arm (see FIG. 6). One of the arms of the inner seat 2 has an axle 23 having a groove 231 adapted to engage with a windshield wiper frame (not shown).

Figure 5:
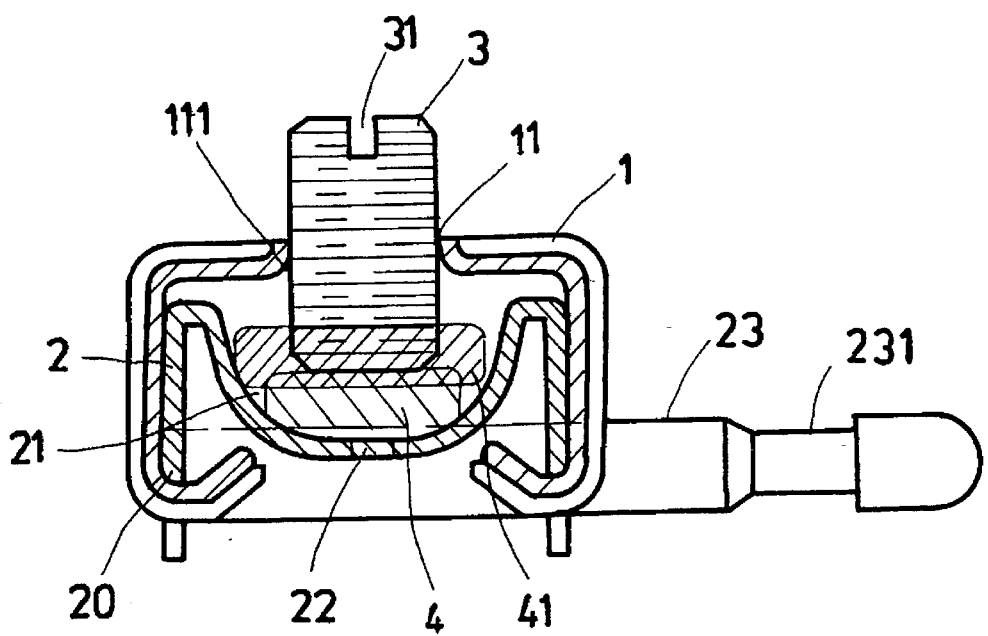

In assembly, a wiper arm 4 is inserted through the space between the outer seat 1 and the inner seat 2 and disposed on the recessed portion 21 of the inner seat 2. Then, the locking bolt 3 is turned by a screwdriver to bear against the top of the wiper arm 4 thereby firmly fastening wiper arm 4 on the wiper arm connector. As the recessed portion 21 is of a curved bottom, it can receive wiper arms of different sizes and shapes (see FIG. 6). FIG. 5 illustrates how a wider wiper arm 41 is firmly engaged the wiper arm connector. When desired to dismantle the wiper arm 4 or 41 from the wiper arm connector, it is only necessary to loosen the locking bolt 3 to disengage the wiper arm from the wiper arm connector.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A universal wiper arm connector comprising:

a generally inverted U-shaped outer seat having a central threaded hole at a top thereof and two downwardly depending arms each having an inwardly extending toothed portion;

a generally M-shaped inner seat adapted to fit into said outer seat, said inner seat having a recessed portion with a curved bottom and two downwardly depending arms formed at a lower edge with teeth adapted to engage with the toothed portion of said outer seat, said recessed portion being formed with a hole adapted to receive a protuberance of a wiper arm; and a locking bolt having external threads engageable with the threaded hole of said outer seat.

* * * * *